(12) United States Patent
Clark et al.

(10) Patent No.: US 6,632,413 B2
(45) Date of Patent: Oct. 14, 2003

(54) METHOD FOR PURIFYING SILICON

(75) Inventors: Roger F. Clark, Newark, DE (US); Michael G. Mauk, Newark, DE (US); Robert B. Hall, Marana, AZ (US); Allen M. Barnett, Landenberg, PA (US)

(73) Assignee: Astropower, Inc., Newark, DE (US)

( * ) Notice: Subject to any disclaimer, the term of this patent is extended or adjusted under 35 U.S.C. 154(b) by 0 days.

(21) Appl. No.: 09/933,882

(22) Filed: Aug. 21, 2001

(65) Prior Publication Data

US 2002/0021996 A1 Feb. 21, 2002

Related U.S. Application Data

(60) Provisional application No. 60/226,665, filed on Aug. 21, 2000.

(51) Int. Cl.[7] .............................................. C01B 33/02
(52) U.S. Cl. ........................ 423/348; 423/349; 423/350
(58) Field of Search ................................ 423/348, 349, 423/350

(56) References Cited

U.S. PATENT DOCUMENTS

| | | | |
|---|---|---|---|
| 4,097,584 A | 6/1978 | Reuschel et al. | 423/348 |
| 4,242,307 A | 12/1980 | Fally | 422/194 |
| 5,182,091 A | 1/1993 | Yuge et al. | 423/348 |
| 5,510,095 A | 4/1996 | Aratani et al. | 423/348 |
| 5,961,944 A | 10/1999 | Aratani et al. | 423/348 |
| 5,972,107 A | 10/1999 | Schmid et al. | 117/79 |
| 5,976,247 A | 11/1999 | Hansen et al. | 117/200 |
| 5,980,629 A | 11/1999 | Hansen et al. | 117/13 |
| 6,090,361 A | 7/2000 | Baba et al. | 423/350 |
| 6,294,726 B1 | 9/2001 | Hässler et al. | 136/258 |

FOREIGN PATENT DOCUMENTS

| | | |
|---|---|---|
| DE | 35 04 723 A1 | 8/1986 |
| EP | 0 007 063 A | 1/1980 |
| EP | 0 855 367 A | 7/1998 |
| FR | 2 515 163 | 4/1983 |
| WO | 99 10275 A | 3/1999 |

OTHER PUBLICATIONS

Processing of MG Silicon for Photovoltaic Applications, C.P. Khattak and F. Schmid, pp. 478, 482–487 (1983).

Growth of Silicon Ingots by Hem for Photovoltaic Applications, C.P. Khattak and F. Schmid, Silicon Processing for Photovoltaics II, edited by C.P. Khattack and K.V. Ravi, Elsevier Science Publishers B.V., 1987, pp. 178, 179, 182, 183.

Patent Abstracts of Japan, vol. 016, No. 518 (C–0999), Oct. 26, 1992 & JP 04 193706 A (Kawaskai Steel Corp), 13 Juy 1992 (Jul. 13, 1992) abstract.

Patent Abstracts of Japan, vol. 2000, No. 20, Jul. 10, 2001 & JP 2001 058811 A (Showa Alum Corp) Mar. 6, 2001 abstract.

*Primary Examiner*—Stanley S. Silverman
*Assistant Examiner*—Maribel Medina
(74) *Attorney, Agent, or Firm*—Burr & Brown

(57) ABSTRACT

A method of purifying silicon, comprising feeding a sparging gas into a liquid melt [10] containing molten silicon and at least one impurity, in which the sparging gas is used to react with or move one or more impurity contained within the silicon. The products of such reaction or movement may be removed, e.g., by liquid-gas extraction, by liquid-liquid extraction or by liquid-solid extraction.

23 Claims, 2 Drawing Sheets

METHOD FOR PURIFYING SILICON

CROSS-REFERENCE TO RELATED APPLICATION

This application claims the benefit of U.S. Provisional Application No. 60/226,665, filed Aug. 21, 2000.

BACKGROUND OF THE INVENTION

1. Field of the Invention

The present invention relates to methods for the purification of metallurgical grade silicon to produce solar grade silicon and to apparatus for use in such methods.

2. Description of Related Art

Silicon that is used in the manufacture of solar cells must have a purity that is commonly referred to as solar grade silicon, typically having no more than about 5 ppm of impurities. Solar grade silicon is significantly more pure than what is commonly referred to as metallurgical grade silicon (which typically has 10,000 ppm of impurities), but does not need to be as pure as what is commonly referred to as electronic grade silicon (which typically has less than 1 ppb of impurities, which is used to make semiconductor devices.

U.S. Pat. No. 5,182,091 discloses purifying silicon by directing a plasma jet toward the surface of molten silicon. The patent discloses that inert gas (such as argon or helium) as the plasma gas may be mixed with 0.1–10% steam and/or less than 1 gram of silica powder per liter of the inert gas. The plasma is generated by using a mixed gas composed of an inert gas (such as argon or helium) and hydrogen, and purification is accomplished by the removal of boron and carbon in the form of oxides.

U.S. Pat. No. 5,961,944 discloses production of silicon for solar cells by:

(a) melting silicon under vacuum to remove phosphorus by evaporation, and then solidifying the residue to form an ingot;

(b) removing the impurity concentrated portion of the ingot by cutting;

(c) re-melting the remaining portion, and removing boron and carbon by oxidizing under an oxidizing atmosphere, and then blowing an argon gas or a mixed gas of argon and hydrogen onto the melt;

(d) casting the deoxidized melt, followed by directional solidification to obtain a second ingot; and (e) removing the impurity concentrated portion of the second ingot by cutting.

U.S. Pat. No. 4,097,584 discloses a method of purifying silicon to produce semiconductor grade silicon, comprising feeding, under pressure, a hydrogen-containing gas stream along with a small amount of water vapor through a body of molten technical-grade silicon.

A significant limitation currently on the use of solar cells has to do with the cost of purifying silicon to solar grade. In view of current energy demands and supply limitations, there is an enormous need for a more cost efficient way of purifying metallurgical grade silicon (or any other silicon having higher impurities than solar grade) to solar grade silicon.

SUMMARY OF THE INVENTION

The present invention is directed to a method of purifying silicon, comprising feeding a sparging gas into a liquid melt (also referred to as a liquid bath) containing molten silicon and at least one impurity.

In accordance with one aspect of the present invention, the sparging gas is fed into the liquid bath at a position between the bottom and the top of the bath.

In accordance with a second aspect of the present invention, the sparging gas is fed into a tube having a sparging gas exit end from which the sparging gas exits said tube into the liquid bath, the sparging gas exit end of said tube being located below the uppermost surface of the liquid bath.

In accordance with a third aspect of the present invention, the liquid bath is within a container and the sparging gas is fed into the liquid bath through a lid or sidewall in the container.

The sparging gas preferably comprises at least one gas selected from the group consisting of argon, oxygen, ammonia, nitrogen, chlorine, water vapor, hydrogen chloride, carbon dioxide, hydrogen, bromine and carbon monoxide.

In accordance with the present invention, the sparging gas is used to react with one or more impurity contained within the silicon. The products of such reaction may be removed by liquid-gas extraction (i.e., where the reaction product is volatile under the conditions in the silicon bath) or by liquid-liquid extraction (i.e., where the reaction product is less dense than the silicon, so that the reaction product rises into a surface slag which is formed on the surface of the liquid melt and is removed therefrom and/or where the reaction product is more dense than the silicon, so that the reaction product sinks into a bottom slag at the bottom of the melt and is later removed therefrom). Some reaction products are harmless to solar grade silicon, and can be left in the silicon bath and ultimately the purified silicon product.

In a preferred aspect of the present invention, by supplying the sparging gas to a location which is between the bottom and the top of the bath, there is created a more active reaction between the gas and the liquid (i.e. enhanced surface area of reaction). That is, the gas is rendered more reactive owing to the large surface area achieved by the bubbles formed in the liquid. One way to supply the sparging gas into the liquid bath at a location which is between the bottom and the top of the bath is to feed the sparging gas through a tube.

In another aspect of the present invention, the sparging gas preferably further comprises entrained solid silica.

The invention may be more fully understood with reference to the accompanying drawing figures and the following description of the embodiments shown in those drawings. The invention is not limited to the exemplary embodiments and should be recognized as contemplating all modifications within the skill of an ordinary artisan.

DETAILED DESCRIPTION OF THE PREFERRED EMBODIMENTS

As mentioned above, according to the present invention, silicon is purified by feeding a sparging gas into a liquid melt containing molten silicon and at least one impurity. The sparging gas can be any gas which reacts with any impurity in the silicon to produce a compound which can be removed from the silicon by one of the processing methods described herein, or which is less troublesome in solar grade silicon than the impurity. Particularly preferred sparging gases in accordance with the present invention include at least one gas selected from among argon, oxygen, ammonia, nitrogen, chlorine, water vapor, hydrogen chloride, carbon dioxide, hydrogen, bromine and carbon monoxide.

The sparging gas or gases is or are preferably selected based on the impurities contained in the silicon. In one aspect of the present invention, two categories of impurities are envisioned. A first target impurity category includes boron and phosphorus; a second target impurity category includes all other impurities. According to the present invention, it has been observed that the sparging process of the present invention is particularly effective in removing members of the second target impurity category.

Figure 1:
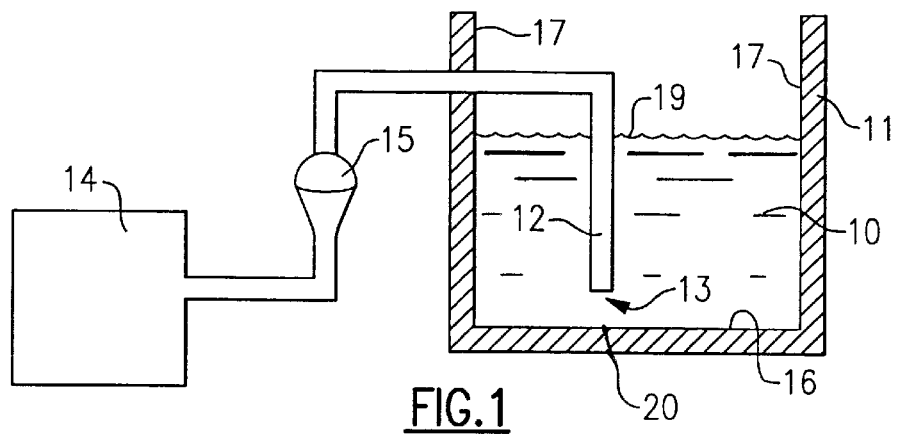
FIG. 1 is a sectional view of a first preferred embodiment of an apparatus for use in purifying silicon in accordance with the present invention.
Figure 5:
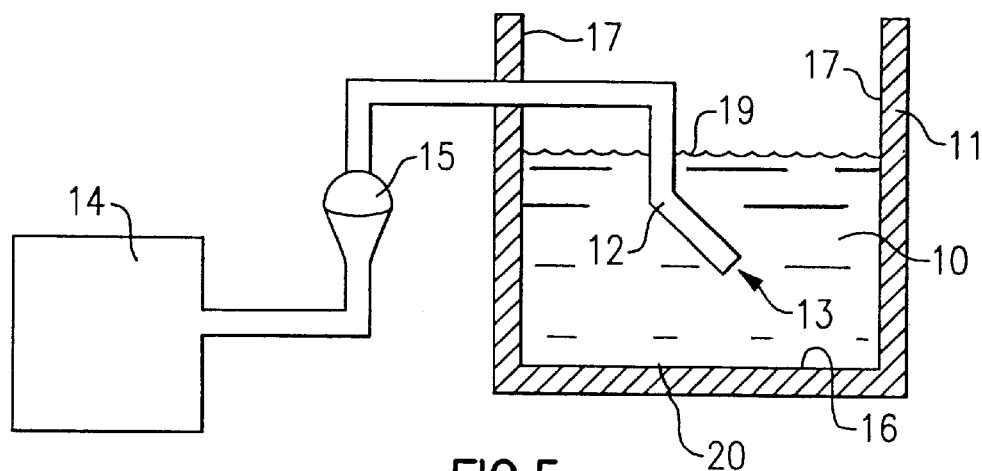
FIG. 5 is a sectional view of a fourth preferred embodiment of an apparatus for use in purifying silicon in accordance with the present invention.
Figure 6:
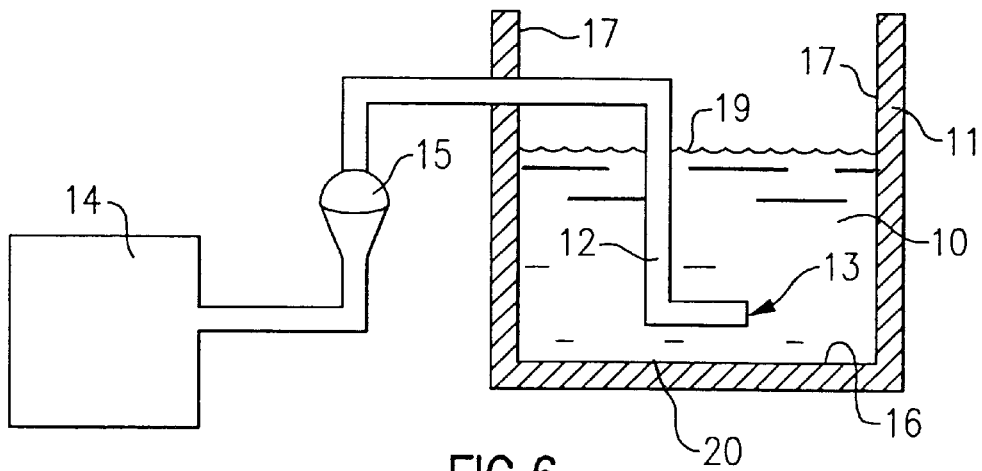
FIG. 6 is a sectional view of a fifth preferred embodiment of an apparatus for use in purifying silicon in accordance with the present invention.

FIG. 1 depicts a preferred embodiment of an apparatus for use in carrying out the present invention. Referring to FIG. 1, molten silicon 10 is provided in a container 11, the molten silicon 10 having an uppermost surface 19 and a lowermost surface 20. The container 11 may be constructed of any suitable material, examples of which are well known in the art. In particular, the container 11 must be capable of resisting the high temperatures used to maintain silicon in liquid state. A substantially cylindrical tube 12 is provided, the tube 12 having a sparging gas exit end 13 within the molten silicon 10. Sparging gas is fed, e.g., from a tank 14 through a flow meter 15, up to a level which is above the uppermost surface 19 of the molten silicon (an anti-siphon portion), and then into the molten silicon 10 through the sparging gas exit end 13 of the tube 12. As the sparging gas passes through the sparging gas exit end 13 of the tube 12, the sparging gas is moving in a direction which is substantially vertical, however, the sparging gas could alternatively be fed in a direction which is non-vertical and non-horizontal (see FIG. 5), or which is substantially horizontal (see FIG. 6). In this embodiment, the container 11 is substantially cylindrical and has a bottom surface 16 and a sidewall 17. However, in general, the container used in the present invention can be of any shape which can hold a liquid silicon bath, e.g., the container may have one or more bottom surfaces and one or more sidewalls. In the embodiment shown in FIG. 1, the tube projects into the liquid bath from the sidewall.

Figure 2:
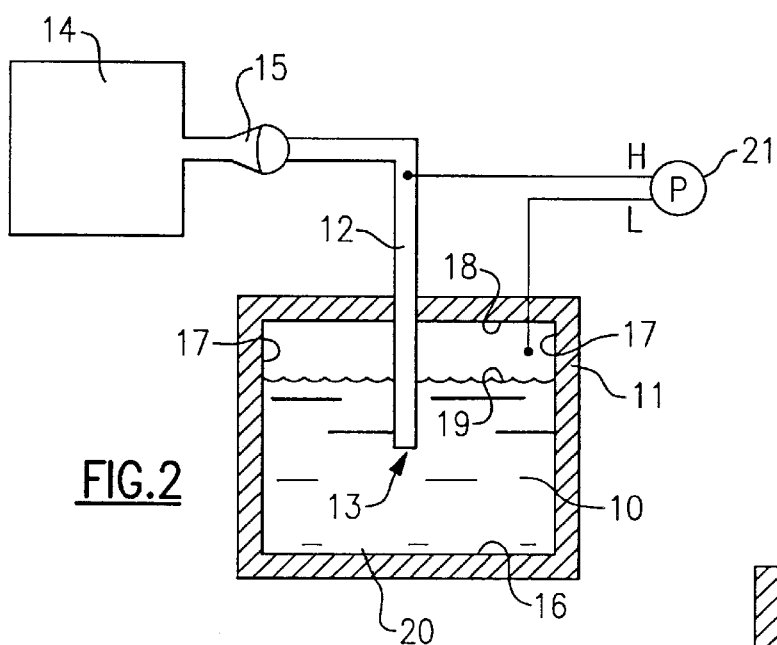
FIG. 2 is a sectional view of a second preferred embodiment of an apparatus for use in purifying silicon in accordance with the present invention.

In the embodiment shown in FIG. 2 (in which structures which correspond to structures shown in FIG. 1 have reference numbers corresponding to those in FIG. 1), the container 11 further includes a top surface 18. In this embodiment, the tube projects into the liquid bath from the top surface. As the sparging gas passes through the sparging gas exit end of the tube, the sparging gas is moving in a direction which is vertically downward.

Figure 3:
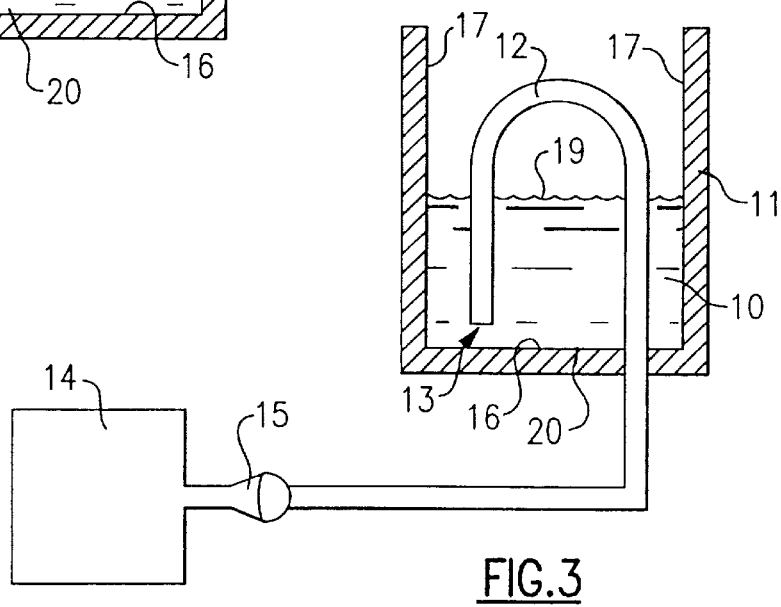
FIG. 3 is a sectional view of a third preferred embodiment of an apparatus for use in purifying silicon in accordance with the present invention.

In the embodiment shown in FIG. 3 (in which structures which correspond to structures shown in FIG. 1 have reference numbers corresponding to those in FIG. 1), the tube 12 projects into the liquid bath from the at least one bottom surface, then upward to a level which is above the uppermost surface 19 of the molten silicon (an anti-siphon portion), and then into the liquid bath.

By providing a tube as described above, it is possible to easily stop and start the flow of sparging gas, i.e., without the need to drain the melt, which would be required, e.g., if the sparging gas were fed to the melt through a porous drain in the bottom of the container.

Figure 4:
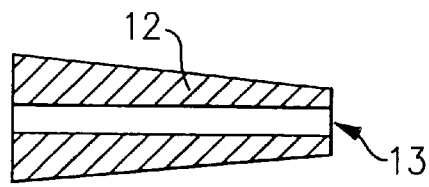
FIG. 4 is a sectional view of an alternative embodiment of a tube for use in an apparatus for purifying silicon in accordance with the present invention.

The tube in accordance with the present invention can be of any shape capable of directing flow of sparging gas, for example, the tube can be a hollow cylinder (e.g., as shown in the tubes 12 in FIGS. 1–3). The tube can have a circular or non-circular cross-section. The tube can comprise a conduit defined by a structure having one or more walls of a substantially uniform thickness, e.g., as shown in FIGS. 1–3. Alternatively, the tube can comprise a conduit defined by a structure having one or more walls of a non-uniform thickness, e.g., as shown in FIG. 4. The tube may comprise a conduit having a substantially uniform cross-section (as in FIGS. 1–3) or a conduit having a non-uniform cross-section (as in FIG. 4).

The tube is preferably constructed of a material or materials which, during use (i.e., when subjected to high temperatures needed to maintain the silicon bath in a molten state), will not contribute to the impurity levels in the silicon bath, that is, which will not contaminate the silicon bath. Preferred materials for use in making the tube include quartz.

In a preferred aspect of the invention, the tube may comprise a first material which is coated with a second material, and in which the second material is capable of maintaining its structural integrity at the high temperatures in the silicon bath, e.g., at least a temperature of about 1500 degrees C. In this aspect of the invention, the first material may comprise any suitable material, e.g., quartz. Likewise, the second material may comprise any suitable material. Preferred examples of materials for use as the second material include devitrification promoters, e.g., as disclosed in U.S. Pat. Nos. 5,976,247 and 5,980,629, the entire disclosures of which are hereby expressly incorporated herein by reference. For example, the second material may contain at least one devitrification promoter which provides crystal nucleation sites on the surfaces of the tube, suitable examples of devitrification promoters including, for example, alkaline earth metal oxides, carbonates, hydroxides, oxalates, silicates, fluorides, chlorides, and peroxides, boron trioxide, and phosphorus pentoxide. Such devitrification promoter, where employed, preferably comprises an alkaline earth metal selected from the group consisting of calcium, barium, magnesium, strontium and beryllium. The alkaline earth metal can be in any form which adheres to the tube surfaces. The alkaline earth metal can be in the form of the element (e.g. Ba), a free ion (e.g. $Ba^{2+}$), or an ion pair with an organic anion such as an oxide, hydroxide, peroxide, carbonate, silicate, oxalate, formate, acetate, propionate, salicylate, stearate, tartrate, fluorine, or chlorine. Preferably, such devitrification promoter comprises one or more oxide, hydroxide, carbonate and/or silicate of one or more alkaline earth metal.

In a further preferred aspect of the present invention, a differential pressure gauge may be provided. In the embodiment shown in FIG. 2, a differential pressure gauge 21 is provided to measure the pressure difference between the interior of the tube 12 and the interior of the container 11 above the liquid bath 10, to enable determining the depth of the melt.

The products of reaction of a sparging gas with an impurity, or solid impurities within the melt, may be removed by any suitable method. One type of such removal is liquid-gas extraction. Liquid-gas extraction may be carried out where the reaction product is volatile under the conditions in the silicon bath, such that the reaction product rises to the surface of the liquid melt, and then escapes from the liquid melt. Such liquid-gas extraction is preferably assisted by applying a reduced pressure. A similar criterion can be employed for application to volatile silicon compound species that can be created in the liquid silicon by introduced sparging gas.

In addition, liquid-gas extraction can be employed to remove high vapor pressure elemental impurities by evaporation. Removal of the volatile species from the molten silicon is preferably conducted under a modest vacuum. Elements which can be extracted from a silicon melt by a liquid-gas extraction procedure include, for example, H, Li, Na, K, Rb, Cs, Fr, Mg, Sr, Zn, Cd, Hg, N, P, As, O, S, Se, Te, Po, F, Cl, Br, I and At. An element is determined to be significantly extractable by a liquid-gas process if its vapor pressure achieves a value of greater than one atmosphere at a temperature of 1400° C. or less. This criterion means that the equilibrium vapor pressures of the selected elements are at least seven orders of magnitude greater than silicon at the same temperature. Using a simplified analysis, and assuming activity coefficients close to one, it can be determined that all the selected elements will be reduced to less than 10 ppm in silicon liquid at 1500° C. under a vacuum condition in a reasonable time period.

Another type of removal of reaction products from a liquid melt is liquid-liquid extraction. Liquid-liquid extraction may be carried out where the reaction product is less dense than the silicon, so that the reaction product rises into a slag on the surface of the liquid melt and is removed therefrom (e.g., by skimming or by pouring off the slag) and/or where the reaction product is more dense than the silicon, so that the reaction product sinks into a slag at the bottom of the melt and is later separated therefrom.

The present invention also facilitates movement of particle impurities such as silicon carbides, silicon nitrides, silicon oxides, or other refractory carbides, nitrides or oxides from within the bath to the surface of the bath, from which they can be removed.

As mentioned above, some reaction products are harmless to solar grade silicon, and can be left in the silicon bath and ultimately the purified silicon product.

In another aspect of the present invention, the sparging gas preferably further comprises entrained solid silica. By providing solid silica with the sparging gas, the silica can react with impurities in metallurgical grade silicon, e.g., Al, Ca and Ti to form slag and thereby assist in purifying the melt. The removal of an impurity may be assisted by the presence of other impurities, e.g., by the formation of stable complex structures which can be segregated.

The methods of the present invention as described above employ processing steps which are analogous to processing used in steelmaking metallurgy. Despite the fact that modern steel metallurgy has roots going back more than a century, there have, nevertheless, been significant developments in the last two decades. Impurities in steel are now routinely controlled at the parts per million level, which represents a two-orders of magnitude reduction from typical impurity level yields in the 1960s. According to the present invention, processing analogous to state-of-the-art steelmaking processing is particularly relevant to silicon purification since the refining of both silicon and steel are based on carbothermic reduction processes. In silicon refining and steel refining, many of the impurities are the same or are chemically similar. In addition, iron purification for steel is implemented in large-scale production at relatively low costs. Indeed, many steel refining processes should be applicable, either directly or with modification, to silicon purification for solar cells on account of analogous chemical metallurgy and the desire for similarities of scale and economics.

Previous attempts have been made to use metallurgical processing for manufacturing a solar grade of silicon. Most attempts have failed, typically because of inabilities to remove boron and phosphorus to sufficient degrees. Attempts that have succeeded in producing solar grade silicon have done so by employing high purity (with respect to boron and phosphorus) starting raw materials (quartz and graphite); these approaches, however, do not meet the cost targets for the solar silicon feedstock product.

Common impurities in pig iron (impure material produced by reduction of iron ore, i.e., iron oxides, by coke in a blast furnace) have a much higher affinity for oxygen than does iron. Carbon, silicon, sulfur, and phosphorus solutes in molten iron can be oxidized with little accompanying oxidation of iron. The oxide products escape the molten iron as gases or else segregate to an immiscible molten slag that floats on top of the liquid iron. The slag is typically a mixture of fused oxides such as calcium oxide (CaO), iron oxide (FeO), and silica ($SiO_2$). The oxidation process throughput is basically limited by rates of mass transfer associated with the formation of the oxide and removal of the oxide from the molten iron bath. In the basic oxygen process (BOP) or Linz-Donawitz converter, supersonic jets of pure oxygen impinge on the molten iron forming metal droplets and an "emulsion" of slag and metal. This greatly increases the interfacial area of contact between the slag, oxygen, and liquid iron, much enhancing the mass transport and heterogeneous reaction rates. In the specific case of carbon removal, this agitation of the melt by the impinging oxygen stream increases the transport of carbon monoxide to the melt surface. Without this agitation, the rate of carbon removal would depend on the prohibitively slow rate of formation and escape of gaseous carbon monoxide bubbles in a stagnant liquid metal.

For the production of special grades of steel with even lower levels of impurities, further refining techniques are utilized. Dissolved gasses such as hydrogen, nitrogen, and oxygen can be removed by physical means such as vacuum degassing. Adding de-oxidizing agents such as silicon or aluminum can be used to further reduce oxygen levels in the melt via reactions such as

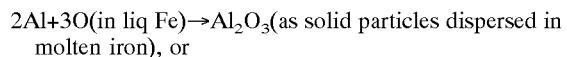
$2Al + 3O$(in liq Fe)$\rightarrow Al_2O_3$(as solid particles dispersed in molten iron), or

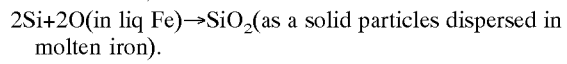
$2Si + 2O$(in liq Fe)$\rightarrow SiO_2$(as a solid particles dispersed in molten iron).

The results of such deoxidization reactions are solid particles of $Al_2O_3$ or $SiO_2$ entrained in the melt. Given sufficient time, these non-metal particles will float to the surface since they are less dense than molten iron. At the surface of the melt, they can be skimmed or poured off the molten iron. The efficacy of these deoxidization processes are attested to by the fact that oxygen concentrations can be reduced to almost 0.1 ppm in the molten iron.

The slag, typically a molten mixture of calcium oxide and other oxides and which is immiscible with molten iron and floats on top of the melt, has an essential function in the removal of sulfur and phosphorus from molten iron. The impurity is redistributed to the slag. For example, in the case of sulfur removal:

CaO(in slag)+S(in melt)+C(in melt)→CaS(in slag)+CO$_2$ (g)

This reaction occurs under reducing conditions.

Similarly, phosphorus is partitioned to the slag by the reaction

3CaO(in slag)+2P(in liq iron)+5O(in metal)→Ca$_3$(PO4)$_2$ (in slag)

which occurs under oxidizing conditions. The purpose of the lime (CaO) component of the slag is to ensure basic conditions; basicity with respect to slags in this instance implies that the slag is capable of absorbing the oxides of sulfur and phosphorus.

As noted above, a slag can be formed at the bottom of the melt (containing materials which are more dense than the molten silicon) instead of or in addition to a surface slag.

Several options or scenarios are considered in the conceptualization of a general strategy for silicon purification based on steel-type refining techniques: For example, for boron, the boron impurity can be converted to a compound which is more amenable to removal, or the boron can be converted to a compound which is relatively benign, i.e., electrically inactive, as an impurity in silicon solar cells.

Further, it may be acceptable that the boron removal step introduces other impurities, since these added impurities might be easily removed in subsequent stages of the process. In essence, this last scenario would be predicated on replacing boron with other more tractable impurities for which efficient removal processes are possible.

Elemental boron dissolved in molten silicon is not sufficiently volatile for removal by vacuum degassing techniques, and therefore a more indirect approach can be used wherein a boron compound is first formed. As discussed above, in iron refining for steelmaking, unwanted impurities are removed by first forming oxides of the impurity. An analogous scheme for the removal of boron from molten silicon includes the preferential formation of a boron compound without the formation of silicon compounds. Oxidation of boron by pure oxygen is not workable since silicon has a higher affinity for oxygen than does silicon. Quantitatively, the Gibbs free energy change for SiO$_2$ formation from molten silicon and oxygen is about 10 kcal/mole-O$_2$ lower than the Gibbs Free Energy change for the formation of B$_2$O$_3$ from O$_2$.

One suitable reaction for treatment of boron impurity is reaction with nitrogen to form boron nitride (BN). The Free Energy of Formation of BN is more favored than the formation of silicon nitride (Si$_3$N$_4$) by about 30 kcal/mole N$_2$, and so contacting nitrogen with molten silicon containing boron impurities will result in the preferential formation of BN particles, with insignificant formation of silicon nitride. To enhance the reaction between the melt and nitrogen, according to the present invention, nitrogen may preferably be blown into the silicon melt. In a preferred aspect of the present invention, the nitrogen is blown supersonically in order to create or enhance agitation.

For some solar cells, boron nitride must be removed. Any of several approaches (or combinations thereof) for doing so may be used in accordance with the present invention. The density of boron nitride and molten silicon are close, so although removal can be accomplished by flotation of the boron nitride particles to the melt surface, this process is apt to be a slow process. Filtration techniques may be employed for removing boron nitride particles from molten silicon. The use of slag for redistributing boron nitride may be used to remove the boron nitride according to the present invention. In such cases, the slag composition is formulated based on its desired melting point and viscosity, its immiscibility with silicon, and its capacity to absorb impurities as quantified by a segregation coefficient.

Although the methods and apparatus for purifying silicon in accordance with the present invention have been described in connection with preferred embodiments, it will be appreciated by those skilled in the art that modifications not specifically described may be made without departing from the spirit and scope of the invention defined in the following claims.

What is claimed is:

1. A method of purifying silicon, comprising feeding a sparging gas into a liquid bath comprising silicon and at least one impurity, said liquid bath having an uppermost surface and a lowermost surface, said sparging gas being fed into said liquid bath at a location between said lowermost surface of said liquid bath and said uppermost surface of said liquid bath, and removing from said liquid bath at least a portion of said at least one impurity, said sparging gas further comprising solid silica.

2. A method of purifying silicon as recited in claim 1, wherein said sparging gas comprises at least one gas selected from the group consisting of argon, oxygen, ammonia, nitrogen, chlorine, water vapor, hydrogen chloride, carbon dioxide, hydrogen, bromine and carbon monoxide.

3. A method of purifying silicon, comprising feeding a sparging gas through a tube having a sparging gas exit end from which said sparging gas exits said tube into a liquid bath comprising silicon and at least one impurity, said liquid bath having an uppermost surface, said sparging gas exit end of said tube being located below said uppermost surface of said liquid bath, and removing from said liquid bath at least a portion of said at least one impurity, said sparging gas further comprising solid silica.

4. A method of purifying silicon as recited in claim 3, wherein said sparging gas comprises at least one gas selected from the group consisting of argon, oxygen, ammonia, nitrogen, chlorine, water vapor, hydrogen chloride, carbon dioxide, hydrogen, bromine and carbon monoxide.

5. A method of purifying silicon as recited in claim 3, wherein said tube has a circular cross-section.

6. A method of purifying silicon as recited in claim 3, wherein as said sparging gas passes through said sparging gas exit end of said tube, said sparging gas is moving in a direction which is non-vertical or vertically downward.

7. A method of purifying silicon as recited in claim 3, wherein said tube comprises a conduit defined by a structure having one or more walls of a substantially uniform thickness.

8. A method of purifying silicon as recited in claim 3, wherein said tube comprises a conduit defined by a structure having one or more walls of a non-uniform thickness.

9. A method of purifying silicon as recited in claim 3, wherein said tube comprises a conduit having a substantially uniform cross-section.

10. A method of purifying silicon as recited in claim 3, wherein said tube comprises a conduit having a non-uniform cross-section.

11. A method of purifying silicon as recited in claim 3, said liquid bath being within a container having at least one bottom surface and at least one sidewall, said tube projecting into said liquid bath from said at least one sidewall.

12. A method of purifying silicon as recited in claim 3, wherein said tube is formed of a material which does not contaminate said liquid bath.

13. A method of purifying silicon as recited in claim 12, wherein said tube comprises quartz.

14. A method of purifying silicon as recited in claim 12, wherein said tube comprises a first material coated with a second material, said second material being capable of maintaining its structural integrity at a temperature of 1500 degrees C.

15. A method of purifying silicon as recited in claim 14, wherein said first material comprises quartz.

16. A method of purifying silicon as recited in claim 14, wherein said second material comprises one or more devitrification promoters.

17. A method of purifying silicon as recited in claim 3, said liquid bath being within a container having at least one bottom surface, at least one top surface and at least one sidewall, said tube projecting into said liquid bath from said at least one top surface.

18. A method of purifying silicon, comprising feeding a sparging gas through a tube having a sparging gas exit end from which said sparging gas exits said tube into a liquid bath comprising silicon and at least one impurity, said liquid bath having an uppermost surface, said sparging gas exit end of said tube being located below said uppermost surface of said liquid bath, and removing from said liquid bath at least a portion of said at least one impurity, said sparging gas moving in a direction which is substantially horizontal as it passes through said sparging gas exit end of said tube.

19. A method of purifying silicon, comprising feeding a sparging gas through a tube having a sparging gas exit end from which said sparging gas exits said tube into a liquid bath comprising silicon and at least one impurity, said liquid bath having an uppermost surface, said sparging gas exit end of said tube being located below said uppermost surface of said liquid bath, and removing from said liquid bath at least a portion of said at least one impurity, said liquid bath being within a container having at least one bottom surface and at least one sidewall, said tube projecting into said liquid bath from said at least one bottom surface.

20. A method of purifying silicon, comprising feeding a sparging gas through a tube having a sparging gas exit end from which said sparging gas exits said tube into a liquid bath comprising silicon and at least one impurity, said liquid bath having an uppermost surface, said sparging gas exit end of said tube being located below said uppermost surface of said liquid bath, and removing from said liquid bath at least a portion of said at least one impurity, and measuring pressure inside said tube.

21. A method of purifying silicon as recited in claim 20, further comprising measuring pressure inside said container above said liquid bath, said pressure inside said tube and said pressure inside said container above said liquid bath being usable to determine a depth of said liquid bath.

22. A method of purifying silicon, comprising feeding a sparging gas into a liquid bath comprising silicon and at least one impurity, said liquid bath being within a container having at least one bottom surface and at least one sidewall, said sparging gas being fed into said bath through said sidewall, and removing from said liquid bath at least a portion of said at least one impurity, said sparging gas further comprising solid silica.

23. A method of purifying silicon as recited in claim 22, wherein said sparging gas comprises at least one gas selected from the group consisting of argon, oxygen, ammonia, nitrogen, chlorine, water vapor, hydrogen chloride, carbon dioxide, hydrogen, bromine and carbon monoxide.

\* \* \* \* \*